United States Patent
Smith et al.

(10) Patent No.: US 6,648,368 B2
(45) Date of Patent: Nov. 18, 2003

(54) DUAL ROOF RAIL AIR BAG WITH INTEGRATED FILL SYSTEM

(75) Inventors: Douglas R Smith, Clinton Township, MI (US); Julius Michael Vida, Brighton, MI (US); Jeffrey A Upchurch, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 37 days.

(21) Appl. No.: 10/107,793

(22) Filed: Mar. 27, 2002

(65) Prior Publication Data

US 2003/0184060 A1 Oct. 2, 2003

(51) Int. Cl.[7] .............................................. B60R 21/22
(52) U.S. Cl. ................. 280/730.2; 280/729; 280/743.2; 280/749
(58) Field of Search ............................. 280/730.2, 749, 280/729, 743.2

(56) References Cited

U.S. PATENT DOCUMENTS

| | | | | |
|---|---|---|---|---|
| 5,480,181 A | * | 1/1996 | Bark et al. | 280/730.2 |
| 5,618,595 A | | 4/1997 | Matsushima et al. | 428/35.2 |
| 5,681,055 A | | 10/1997 | Green et al. | 280/728.2 |
| 5,791,683 A | | 8/1998 | Shibata et al. | 280/730.2 |
| 5,829,779 A | | 11/1998 | Nakashima et al. | 280/730.2 |
| 5,853,191 A | | 12/1998 | Lachat | 280/730.2 |
| 5,865,462 A | * | 2/1999 | Robins et al. | 280/730.2 |
| 5,884,937 A | | 3/1999 | Yamada | 280/730.2 |
| 5,899,489 A | | 5/1999 | Jost | 280/730.2 |
| 5,924,722 A | | 7/1999 | Koide et al. | 280/730.2 |
| 5,957,487 A | | 9/1999 | Stutz | 280/730.2 |
| 6,010,149 A | | 1/2000 | Riedel et al. | 280/730.2 |
| 6,042,141 A | * | 3/2000 | Welch et al. | 280/729 |
| 6,095,551 A | * | 8/2000 | O'Docherty | 280/730.2 |
| 6,152,481 A | | 11/2000 | Webber et al. | 280/730.2 |
| 6,176,515 B1 | * | 1/2001 | Wallner et al. | 280/730.2 |
| 6,186,536 B1 | * | 2/2001 | Fischer | 280/730.2 |
| 6,203,058 B1 | * | 3/2001 | Elqadah et al. | 280/730.2 |
| 6,234,516 B1 | * | 5/2001 | Boxey | 280/730.2 |
| 6,244,619 B1 | * | 6/2001 | Satzger | 280/730.2 |
| 6,264,234 B1 | * | 7/2001 | Hill et al. | 280/730.2 |
| 6,276,712 B1 | * | 8/2001 | Welch et al. | 280/730.2 |
| 6,390,502 B1 | * | 5/2002 | Ryan et al. | 280/743.2 |
| 6,450,529 B1 | * | 9/2002 | Kalandek et al. | 280/730.2 |
| 6,508,487 B2 | * | 1/2003 | Koster | 280/730.2 |
| 6,517,110 B1 | * | 2/2003 | Butters et al. | 280/749 |
| 6,527,296 B2 | * | 3/2003 | Bakhsh et al. | 280/730.2 |
| 6,554,314 B1 | * | 4/2003 | Uchiyama et al. | 280/730.2 |
| 2002/0070357 A1 | * | 6/2002 | Kim et al. | 250/493.1 |

FOREIGN PATENT DOCUMENTS

| | | | |
|---|---|---|---|
| DE | 2297950 | 2/1995 | B60R 21/22 |
| DE | 2312877 | 5/1996 | B60R 21/16 |
| EP | 0896909 A2 | 2/1999 | B60R 21/16 |

* cited by examiner

Primary Examiner—Lesley D. Morris
Assistant Examiner—Deanna Draper
(74) Attorney, Agent, or Firm—Laura C. Hargitt

(57) ABSTRACT

A dual roof rail air bag is provided with an integrated fill system. The air bag system has an inflatable curtain attached to the roof rail of the vehicle, and an inflatable tube structure attached to the bottom end of the inflatable curtain. A single manifold simultaneously provides gas from an inflator to the inflatable curtain and the inflatable tube structure in an integrated manner.

15 Claims, 3 Drawing Sheets

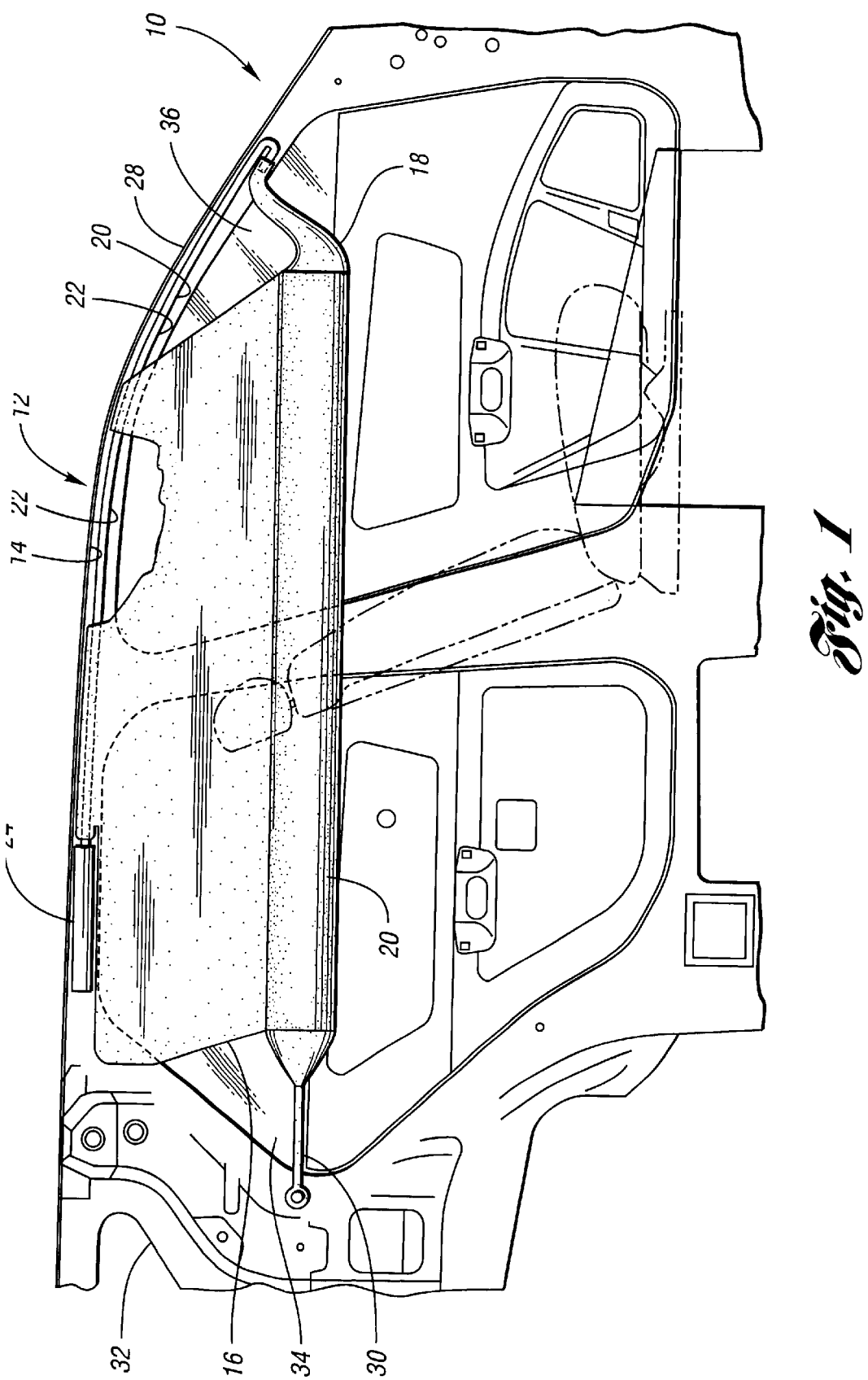

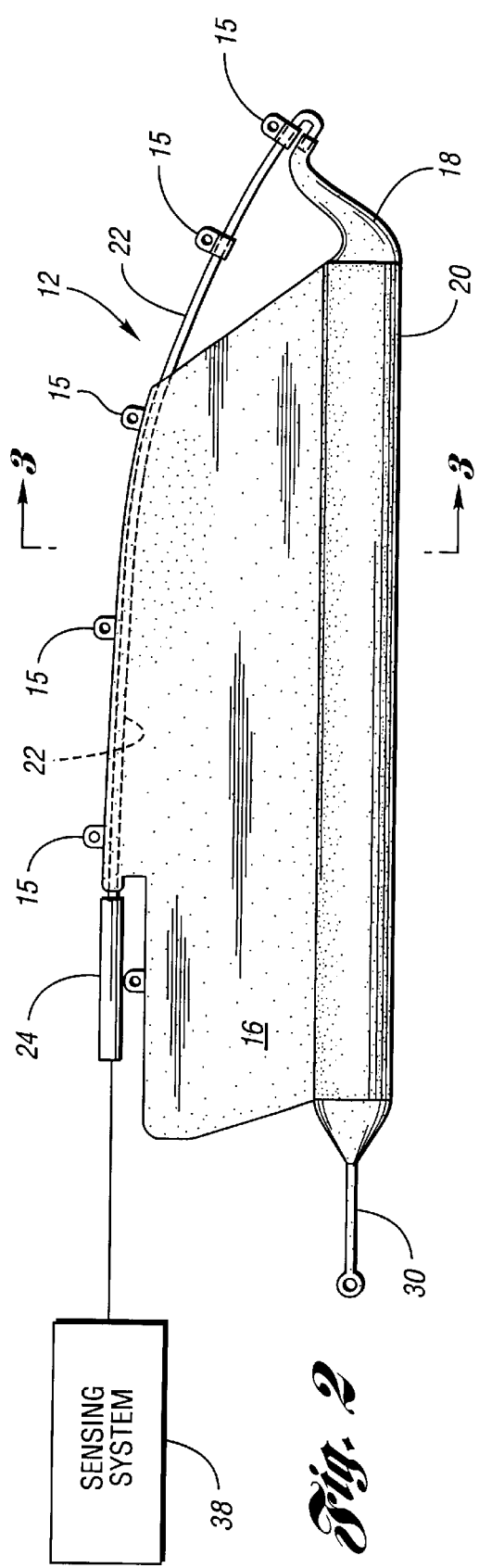
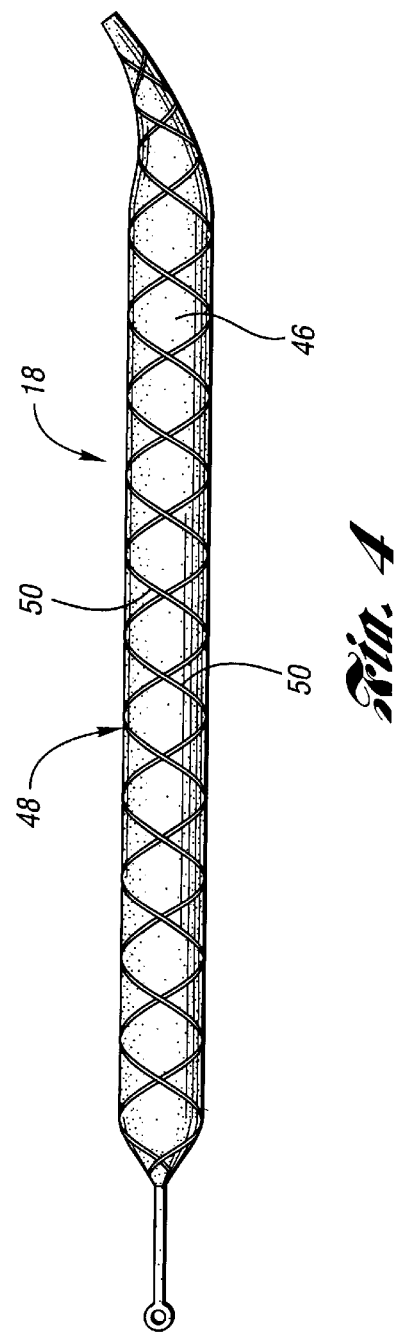
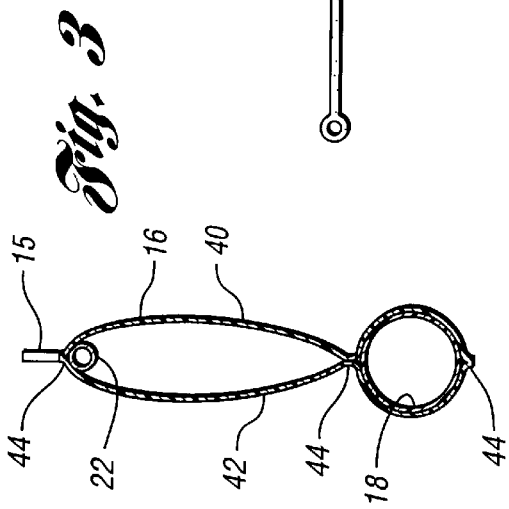

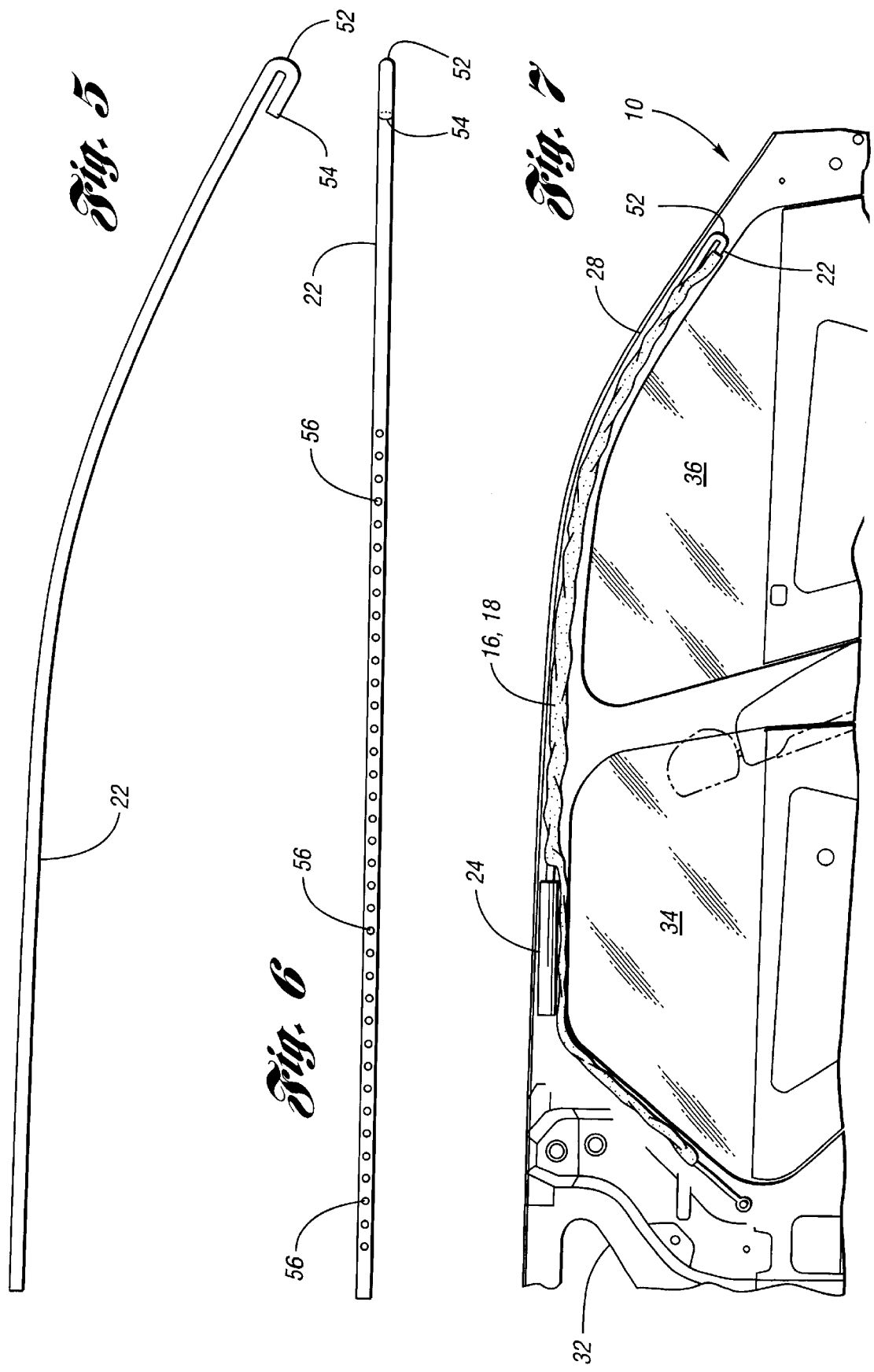

DUAL ROOF RAIL AIR BAG WITH INTEGRATED FILL SYSTEM

BACKGROUND OF THE INVENTION

1. Field of the Invention

The invention is related to the field of automotive impact and rollover protection systems and in particular to an occupant rollover containment and protection system.

2. Background Art

The safety of the occupants of an automotive vehicle involved in a crash and subsequent rollover is of prime concern to the automotive industry, in particular, with sport utility vehicles (SUV) and small trucks, such as pickup trucks. Initially, seat belts were incorporated into the vehicles to secure the occupants to the seat in the event of an accident. Currently all automotive vehicles by law are now equipped with seat belts. Subsequently, shoulder harnesses were also incorporated with the seat belts to minimize forward pitching of the occupants in head-on collisions. To further protect the occupants, front seat air bags are now being provided on steering wheels and instrument panels of the vehicles. More recently, inflatable side air bags are being developed to protect and constrain the occupants inside the vehicle in the event of a side impact or rollover event. Typical examples of such side air bags are taught by James Lloyd Webber et al. in U.S. Pat. No. 6,152,481, and by Myron Castro in Published European Patent Application EPO 896909 A2.

It is desirable to incorporate into sport utility vehicles and light trucks a rollover protection system, which is designed to protect the occupants from injury resulting from side impacts and rollovers.

SUMMARY OF THE INVENTION

A dual roof rail air bag includes an integral fill system having an inflatable curtain, which when deployed covers at least one side window of the vehicle, and inhibits the ejection of an occupant in the event of a rollover. Attached to the bottom of the inflatable curtain is an inflatable tube structure connected between the front pillar of the vehicle and a rear pillar. An inflator, when activated by a sensor, quickly provides inflation gas for inflating the inflatable curtain and the inflatable tube structure. A manifold has one end attached to the inflator and an opposite end attached to the input to the inflatable tube structure in a region adjacent to the front pillar of the vehicle. A first portion of the manifold passes through the inflatable curtain adjacent to the roof rail. The first portion of the manifold, inside the inflatable curtain, has a series of holes, which allows inflator gas passing through the manifold to bleed into the inflatable curtain. This provides for simultaneous and integrated inflation of both the inflatable curtain and the inflatable tube structure. In the preferred embodiment, the number and size of the holes in the first portion of the manifold are selected to enable inflation of the inflatable tube structure at a rate slightly higher than the rate at which the inflatable curtain is inflated.

A first object of the invention is a dual roof rail mounted air bag with an integrated fill system.

Another object is an integrated fill system in which the inflatable tube structure is inflated at a rate slightly faster than the inflatable curtain.

Still another object of the invention is an inflation system in which a single manifold simultaneously inflates the inflatable curtain and the inflatable tube structure.

Another object of the invention is to have a portion of the manifold pass through the interior of the inflatable curtain, and to provide holes in the manifold to bleed inflation gas into the inflatable curtain.

Still another object of the invention is to fill the inflatable tube structure from the forward end adjacent the front pillar of the vehicle.

Yet another object of the invention is to provide a 180° bend at the end of the manifold such that the inflation gas exits the manifold in a direction parallel to the inflatable tube structure in its stored state.

A final object of the invention is an inflatable tube structure that reduces in length when inflated and forms a rigid cushion to prevent an occupant from being ejected from the vehicle in the event of a rollover.

These and other objectives will become more apparent from a reading of the detailed description of the invention in conjunction with the figures.

DETAILED DESCRIPTION OF THE DRAWINGS

FIG. 1 is a partial side view of the interior of a vehicle with the dual roof rail air bag system deployed;

FIG. 2 is a side view of the air bag system independent of the vehicle;

FIG. 3 is a cross-sectional view of the air bag system taken along section lines 3—3 of FIG. 2;

FIG. 4 is a side view of the inflatable tube structure;

FIG. 5 is a side view of the gas manifold;

FIG. 6 is a bottom view of the gas manifold; and

FIG. 7 is a partial side view of the interior of a vehicle with the air bag system in the stored state.

DETAILED DESCRIPTION OF THE PREFERRED EMBODIMENT

FIG. 1 is a partial interior side view of the left or driver side view of an automotive vehicle 10 such as a sport utility vehicle (SUV) or a pick-up truck with the inventive dual roof rail air bag system 12 in the deployed state. It is contemplated that a corresponding dual roof rail air bag system would be implemented on the right or passenger side of the vehicle. Since the left and right side roof rail air bag systems would be substantially a mirror image of each other, only the left or driver side dual roof rail air bag systems will be discussed in detail. Further, the roof rail air bag will be discussed relative to a four door sport utility vehicle, but it is to be understood that the roof rail air bag could also be installed in any vehicle.

The roof rail air bag system 12 is attached to the roof rail 14 of the vehicle 10 by means of mounting tabs 15, shown in FIG. 2. The roof rail air bag system includes an inflatable curtain 16 with an integral sleeve 20, an inflatable tube structure 18 slidably received in the sleeve 20, and a gas manifold 22, which is partially captivated inside the inflatable curtain 16 in the region adjacent to the roof rail 14 as more clearly shown in FIGS. 2 and 3. The gas manifold 22 is connected at one end, the receiving end, to an inflator 24 and extends forward along the roof rail to the front or "A" pillar 28 of the vehicle. As indicated in FIG. 2, the inflator 24 is activated by a sensing system 38 located elsewhere on the vehicle 10. The opposite end, or delivery end, of the gas manifold 22 is connected to an input end of the inflatable tube structure 18. The inflatable tube structure 18 is anchored at its other end to the rear or "C" pillar 32 of the vehicle 10 by means of a strap 30, as shown in FIG. 1. In the deployed state, as shown in FIG. 1, the inflatable curtain 16 effectively covers the side windows 34 and 36 of the vehicle, and the inflatable tube structure 18 extends horizontally along the bottom edge of the side windows 34 and 36.

In the undeployed state, the roof rail air bag system 12 is folded and stored along the roof rail 14 and down the "A" pillar 28 and "C" pillar 32 as shown in FIG. 7.

The inflatable curtain portion 16, and sleeve 20 are made from a material comparable to the material used in conventional front seat air bags. This material is a coated woven fabric. As shown in FIG. 3, the inflatable curtain 16 and sleeve 20 are formed from an outer panel 40 adjacent to the side windows 34 and 36 and an inner panel 42. The outer panel 40 is sealed to the inner panel 42 along three seams 44 where the seams are preferably sealed by some suitable combination of sewing, bonding spray adhesion or radio frequency bonding so that the inflating gas from the inflator 24 will remain in the inflatable curtain 16 for an extended period of time. This extended period of time is the time necessary to keep the inflatable curtain 16 inflated in the event of secondary impact or rollover. FIG. 3 is a cross-sectional view of the roof rail air bag system 12 taken along Section line 3—3 of FIG. 2.

The details of the inflatable tube structure. 18 are shown in FIG. 4. The inflatable tube structure 18 includes an inflatable tube member 46 made from a coated woven fabric such as typically used in front seat air bags. The tube member 46 is circumscribed with a tensioning mechanism 48, which preferably is a braided structure. In the preferred embodiment, the braided structure includes at least a pair of high strength core or fibers 50 wound in clockwise and counterclockwise directions, respectively about the inflatable tube member 46. As is known in the art, when the inflatable tube member 46 is not inflated, the spirals of fibers 50 are stretched out longitudinally and have a maximum length. However, when the tube member 46 is inflated, the diameter of the spirals is increased. As a result, the length of the tensioning mechanism 48 decreases providing a desired reduction in length of the tube member 46. This shrinking produces a force deploying the roof rail air bag system 12 to the state shown in FIG. 1. It is recognized that other configurations of the tensioning mechanism are possible, such as a simple spiral or zigzag pattern. The encapsulation of the inflatable tube member 46 in the braided tensioning mechanism 48 results in the inflatable tube structure 18 becoming relatively rigid when inflated. This rigidity holds the inflatable curtain 16 in place when deployed and helps retain the occupant inside the vehicle in the event of a rollover.

The gas manifold 22, as shown in FIGS. 5 and 6, is a hollow rigid pipe, which extends inside the inflatable curtain 16 adjacent to the roof rail 14, then extends outside the inflatable curtain downwardly adjacent to the front or "A" pillar 28 to a location adjacent to the input to the inflatable tube structure 18. At this location, the manifold 22 has a 180° bend such that the end 54 points back, parallel to the vehicle's "A" pillar 28. This end of the gas manifold has the appearance of a shepherd's hook. This 180° bend at the end of the manifold 22 provides that the inflation gas exiting from the end of the gas manifold 22 is in the direction of the inflatable tube structure 18 when it is folded in the undeployed state adjacent to the "A" pillar as shown in FIG. 7. The gas manifold 22 is preferably made from an aluminum alloy having an external diameter of approximately 14.0 millimeters, and an internal diameter of approximately 10 millimeters. The radius of the bend 52 as shown in FIG. 5 is between 15–17 millimeters. This has been found to result in a smooth bend with little or no constriction to the gas flow in the inflatable tube structure. FIG. 6 shows a bottom view of the gas manifold 22, which shows the inflator gas feed holes 56 provided inside the inflatable curtain 16. These feed holes provide inflator gas to inflate the inflatable curtain 16 simultaneously with the inflation of the inflatable tube structure 18 through end 54. There are approximately seventeen 2.5 millimeter diameter feed holes 56 provided in the manifold 22. This structural arrangement results in the inflatable tube structure 18 being inflated at a slightly faster rate than the inflatable curtain 16. As a result, the roof rail air bag system 12 becomes fully positioned prior to the inflatable cushion 16 being fully inflated. This results in a smoother and more efficient deployment of the roof rail air bag system 12.

FIG. 7 shows the roof rail air bag system 12 in its predeployment state. In this state the inflatable curtain 16 and the inflatable tube structure 18 are folded and stored beneath a molding above the doors and a molding covering the interior portion of the "A" and "C" pillars, respectively. Alternatively, the roof rail air bag system may be stored above the vehicle's headliner out of view. Upon sensing a side impact or rollover condition the inflator 24 is activated. The inflatable tube structure 18 and inflatable curtain 16 burst open the molding and or headliner in which they are stored. With the expansion of the inflatable tube structure 18, its length is shortened, and produces a force in combination with the inflatable curtain 16 fully deploying the roof rail air bag system as shown in FIG. 1. As previously indicated, the inflatable tube structure 18 is inflated at a faster rate than the inflatable curtain assuring a rapid and positive displacement of the inflatable tube structure to its proper position.

While the best mode for carrying out the invention has been described in detail, those familiar with the art to which this invention relates will recognize various alternative designs and embodiments for practicing the invention as defined by the following claims.

What is claimed is:

1. A roof rail air bag system for an automotive vehicle having a stored state and a deployed state, the air bag system comprising:

an inflatable curtain attached to a roof rail of the vehicle, the inflatable curtain operative to cover at least one side window of the vehicle in the deployed state;

an inflatable tube structure disposed along a bottom edge of the inflatable curtain, the inflatable tube structure having an input end fixed in a front pillar and a closed end fixed in a rearward pillar of the vehicle, the inflatable tube structure positioning the inflatable curtain over the at least one window when inflated;

an inflator for rapidly providing inflation gas under pressure to the inflatable tube structure and the inflatable curtain when activated; and a gas manifold operable to receive gas from the inflator through a received end, the manifold having a first portion extending part way through the interior of the inflatable curtain and having a plurality of holes to deliver gas to the inflatable curtain, the manifold further having a second portion extending external to the inflatable curtain along the front pillar of the vehicle and operable to deliver gas through a delivery end to the inflatable tube structure, wherein the gas manifold delivers gas substantially simultaneously to the inflatable curtain and the inflatable tube structure.

2. The air bag system of claim 1 wherein at least a forward portion of the inflatable tube structure is stored in the front pillar of the vehicle above the delivery end of the manifold, a 180° bend is provided at the delivery end of the gas manifold such that the inflator gas exiting the delivery end of the gas manifold is discharged in a direction parallel to the length of the stored inflatable tube structure.

3. The air bag system of claim 2 wherein the gas manifold is a tube having an external diameter of approximately 14 millimeters and an internal diameter of 10 millimeters.

4. The air bag system of claim 3 wherein the 180° bend of the tube has a radius approximately 16 millimeters.

5. The air bag system of claim 3 wherein the 180° bend of the tube has a radius between 15 and 17 millimeters.

6. The air bag system of claim 2 wherein the first portion of the gas manifold has approximately seventeen 2.5 millimeter diameter through holes.

7. The air bag system of claim 1 wherein the inflatable tube structure comprises:

an inflatable tube member having an input end attached to the delivery end of the manifold; and a tensioning mechanism circumscribing the inflatable tube member, the tensioning mechanism operative to shrink its length in response to the inflation of the tube member to produce a positioning force deploying the air bag system from a stored state to the deployed position.

8. The air bag system of claim 7 wherein the inflatable tube structure further comprises:

a strap connecting a closed end of the inflatable tube member to the rearward pillar.

9. A dual roof rail air bag with integrated fill system for an automotive vehicle comprising:

an inflatable curtain attachable to a roof rail of the vehicle, the inflatable curtain having a stored state and a deployed state covering at least one side window of the vehicle;

a sleeve provided along a bottom edge of the inflatable curtain, the sleeve located along the bottom of the at least one side window of the vehicle in the deployed state;

an inflatable tube structure slidably disposed in the sleeve, the inflatable tube structure responsive to inflation to rigidly support the inflatable curtain over the at least one side window of the vehicle;

an inflator for providing a gas to rapidly inflate the inflatable curtain and the inflatable tube structure; and a gas manifold having a receiving end attached to the inflator and a delivery end attached to the inflatable tube member adjacent to the front pillar of the vehicle, the manifold having a first portion extending along the roof rail of the vehicle inside the inflatable curtain, the first portion configured to simultaneously transmit at least a portion of the gas flow from the inflator into the inflatable curtain and to transport the remainder to the inflatable tube structure in an integrated manner.

10. The system of claim 9 wherein the system further includes a rollover sensor for activating the inflator in the event of a rollover.

11. The system of claim 9 wherein a gas input end of the inflatable tube structure is stored adjacent to the front pillar of the vehicle at the delivery end of the gas manifold, the manifold having a 180° bend adjacent the delivery end such that the inflation gas exiting from the gas manifold is discharged into the inflatable tube structure in a direction parallel to its stored position.

12. The system of claim 1 wherein the gas manifold is a rigid tube having an external diameter of approximately 14 millimeters, and an internal diameter of approximately 10 millimeters, and the 180° bend has a radius of between 15 and 17 millimeters.

13. The system of claim 11 wherein the first portion of the gas manifold has a series of holes provided through the wall of the manifold inside the inflatable curtain to transport at least a portion of the inflation gas into the inflatable curtain.

14. The system of claim 13 wherein the series of holes consists of approximately seventeen 2.5 millimeter diameter holes.

15. The system of claim 9 wherein the inflatable tube structure comprises:

an inflatable tube member having a gas input end adjacent to the front pillar of the vehicle and a distal end;

a strap connecting the distal end of the inflatable tube structure to a rear pillar of the vehicle; and a tensioning mechanism circumscribing the inflatable tube member, the tensioning mechanism responsive to the inflation of the tube member to reduce its length to provide a positioning force deploying the air bag system from its stored position to its deployed position.

\* \* \* \* \*